Aug. 30, 1966  J. ULDERUP ETAL  3,269,758
BALL JOINT DEVICE
Filed Dec. 28, 1964
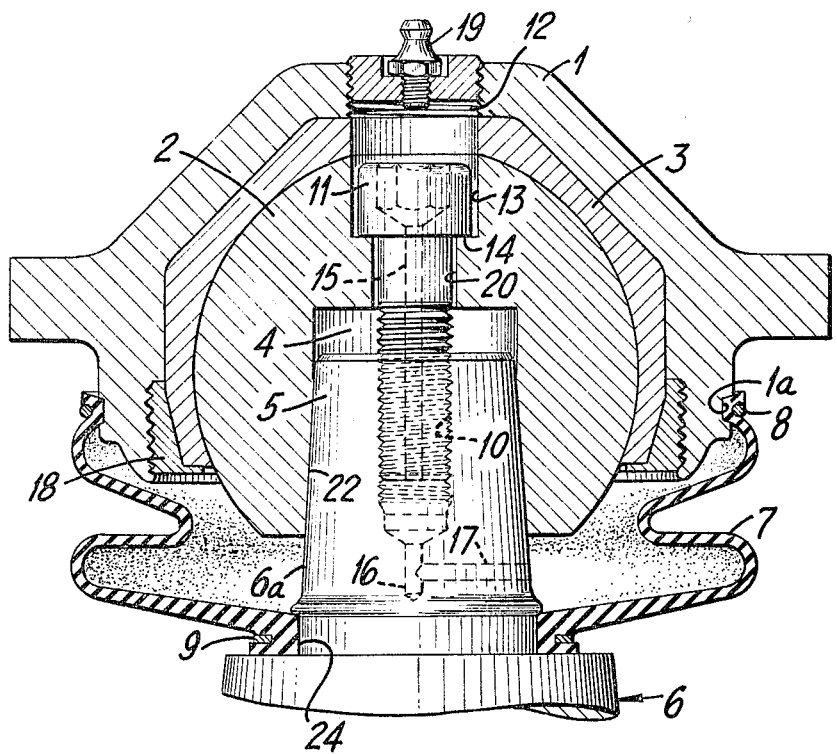
INVENTORS.
JÜRGEN ULDERUP
GEORG KINDEL
BY
*McGlew & Toren*
ATTORNEYS.

United States Patent Office  3,269,758
Patented August 30, 1966

3,269,758
BALL JOINT DEVICE
Jürgen Ulderup and Georg Kindel, Lemforde, Hannover, Germany, assignors to Lemforder Metallwaren AG Lemforde, Hannover, Germany
Filed Dec. 28, 1964, Ser. No. 421,382
Claims priority, application Germany, Jan. 29, 1964, L 46,908
4 Claims. (Cl. 287—87)

This invention relates in general to ball or swivel joint construction, and in particular to a new and useful swivel joint connection for wheel guide members on the axle spindle bolt of steering wheels of motor vehicles.

For guiding and suspending steered wheels of motor vehicles there is usually provided cross leaf springs or rocking levers which are articulated on the vehicle in the manner of a linkage quadrangle. These wheel guide members are usually connected on their wheel side by means of a journal on a so-called axle spindle bolt, with the spindle support carrying the wheel by means of a ball and socket joint. For reasons of space it is desirable to use ball and socket joints of relatively low height. It is known to engage the ends of the axle spindle bolt in a ball arranged in a fixed housing. Such a construction results in a relatively low height of swivel connection without having to make the axle spindle bolt integral with the ball joint which would be a rather complicated construction. It is also known to secure the bolt elements engaging a cylindrical bore of ball joint by a screw supported in the ball. In such a swivel joint construction the fastening screw for the bolt end is only accessible when the joint housing is divided and a part of the housing is first removed. These joints can therefore only be assembled in the final assembly of the vehicle. Apart from the fact that this renders the assembly of the joint and of the vehicle more difficult, the manufacture of such housings which are made up of several parts is relatively expensive.

In accordance with the present invention, there is provided a ball joint construction which overcomes the disadvantages of the prior art and which includes a ball which is held to an end of the axle spindle bolt by means of a threaded screw which is recessed within the end of the ball. The housing for the joint which surrounds and is pivotal on the ball is provided with an access opening for engaging and inserting or removing the ball from the axle spindle bolt.

In accordance with one embodiment of the invention, a bore is defined in the joint housing opposite the inlet opening of the securing bolt which extends through the ball and the opening is defined completely through the housing and through the bearing lining defined in the interior thereof. The axle bolt for this purpose is provided with a threaded end or receiving bore for receiving the fastening screw. Such a construction makes it possible to assemble the joint in a simple and easy manner while maintaining a low height of the joint. The construction is such that the fastening screw is readily accessible by removing a pressure grease fitting provided in a bore of the housing. The housing and the ball and the bearing lining for the ball can be rapidly detached from the journal end of the axle spindle bolt after removing the customary flexible gasket secured between the housing and the spindle bolt. The joint housing can be manufactured as a shell-like molded part and is therefore very cheap and easy to machine. The joints can also be delivered fully assembled on the assembly line without waiting for the progress of the automobile.

According to another feature of the invention, the bolt ends and their receiving bore in the ball joint are partly or completely tapered. This insures that there will always be a satisfactory press fit between the bolt and the ball joint during the assembly of the joint after the tightening of the fastening screw.

In order to permit a satisfactory lubrication of the swivel joint, the fastening screws are advantageously provided with a central oil duct extending through the bore for receiving the securing bolt in the axle bolt member and laterally to the oil chamber formed by the flexible gasket.

Accordingly, it is an object of the invention to provide an improved ball joint construction in which the ball member is secured to an axle bolt by means of a securing screw threaded into the axle bolt.

A further object of the invention is to provide a ball joint which provides securing means for the mounting of a ball on an axle member which makes it possible to easily assemble and disassemble the parts and to make the parts of relatively inexpensive material.

A further object of the invention is to provide a ball joint construction in which the ball member is recessed and provided with a bore for accommodating a securing screw which is threaded into an axle bolt member to which the ball is connected, and which further includes a housing which surrounds the ball member having a lining for pivoting the ball member thereon, the securing screw advantageously having a bore defined therethrough for conducting lubricant through the screw and to the area of the ball which is relatively pivotal in respect to the bearing lining.

A further object of the invention is to provide a ball joint which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The only figure of the drawing is a partial transverse sectional view of a ball joint on the end of an axle bolt of a steering mechanism constructed in accordance with the invention.

Referring to the drawing in particular, the invention embodied therein comprises a ball joint construction including a housing 1 which is made in the form of a shell and which is connected in known manner with a wheel guide member (not shown) or which is made integral therewith. The joint includes a ball 2 on which the housing is pivotal, the sliding being effected between the surface of the ball and a bearing lining 3 which may be made of the usual bearing metal or a suitable elastic material.

In accordance with the invention the ball 2 is provided with a through opening or bore 20 which, together with an enlarged outer bore 13, defines a shoulder portion 14 for receiving the head of a securing screw 11. The opposite side of the bore 20 leads to an enlarged bore portion 4 and to an outwardly tapered bore portion 22 which receives an end 5 of an axle spindle bolt 6. The lower portion of the housing 1 has an external annular recess 1a for receiving the upper end of an elastic gasket member 7 which is held in the recess by means of a clamping ring 8. The lower end of the gasket 7 is retained over an annular recess 24 of the spindle bolt 6 by means of a ring 9.

The end 6a of the spindle bolt 6 is tapered for fitting into the tapered bore 22 and the ball 2 is held to the axle spindle 6 by the securing bolt 11 which is threaded into a bore 10 of the spindle bolt. The bore 10 leads to a small sized passage 16 which connects to a lateral passage 17 which opens exteriorly of the bolt into the space surrounded by the gasket 7. The securing bolt 11 is provided with a passage 15 to permit insertion of lubricant to the securing bolt and to the space between the gasket 7 and the ball 2 after the securing bolt has been positioned in place to hold the ball to the axle bolt 6. An opening 12 of the same diameter as the bore 13 is defined in the housing 1 and the bearing lining 3 to permit access to the head of the securing bolt 11 for insertion and removal purposes. In addition, lubrication may be inserted through the bore 15 of the bolt 11 by directing it under pressure through a pressure grease fitting 19 which is threaded into the opening 12 of the housing 1. In the construction indicated, the bearing lining 3 is held in the housing 1 by means of a bearing ring 18.

While a specific embodiment of the invention has been shown and described in detail to illustrate the application of the inventive principles, it will be understood that the invention may be embodied otherwise without departing from such principles.

What is claimed is:

1. A ball joint construction particularly for the connection of wheel guide members to the axle spindle bolt of steering wheels of motor vehicles, comprising a housing having a lining with a substantially spherical bearing surface, a ball joint member having a substantially spherical exterior surface in sliding engagement with said bearing surface and having a bore defined therethrough, an axle spindle bolt inserted into one end of the bore of said ball joint, said spindle bolt having a threaded bore defined in an end thereof, a securing screw extending into the bore of said ball joint member from the end opposite to said axle spindle bolt and threaded into the bore of said axle spindle bolt and holding said ball joint member to said axle spindle bolt, seal means connected between said housing and said spindle bolt, said housing being pivotal on said ball joint member and having an access opening alignable with the securing screw for insertion and removal thereof, said securing screw having a bore defined therethrough for inserting lubricant from said access opening through said bore, said axle spindle being provided with a lubricating passage connected to said bore of said securing screw and to the space around said axle spindle between said axle spindle and said housing within said seal means for distributing the lubrication.

2. A ball joint construction particularly for the connection of wheel guide members to the axle spindle bolt of steering wheels of motor vehicles, comprising a housing having a lining with a substantially spherical bearing surface, a ball joint member having a substantially spherical exterior surface in sliding engagement with said bearing surface and having a bore defined therethrough, an axle spindle bolt inserted into one end of the bore of said ball joint, said spindle bolt having a threaded bore defined in an end thereof, a securing screw extending into the bore of said ball joint member from the end opposite to said axle spindle bolt and threaded into the bore of said axle spindle bolt and holding said ball joint member to said axle spindle bolt, said housing being pivotal on said ball joint member and having an access opening alignable with the securing screw for insertion and removal thereof, a flexible gasket connected between said housing and said axle spindle bolt, and passage means defined in said securing screw and extending through a portion of said axle spindle bolt to the space enclosed by said gasket for directing lubricant into the space between said gasket and said spindle bolt.

3. A ball joint construction, particularly for the connection of wheel guide members to the wheels of motor vehicles, comprising a housing having a lining with a substantially spherical bearing surface, a ball joint member having substantially spherical exterior surface in sliding engagement with said bearing surface and having a bore defined therethrough with an interior shoulder defined in the bore, an axle spindle bolt inserted into the bore from the end opposite the shoulder, said spindle bolt having a threaded bore defined in an end face thereof, a securing screw extending into the bore of said ball joint member and having a head portion engaged on the interior shoulder and having a threaded end portion threaded into the bore of said axle spindle bolt, seal means connected between said housing and said spindle bolt, said housing being pivotal on said ball member having an access opening alignable with the bore of said ball joint member for access to said securing screw, a grease fitting secured on said housing over the opening of said housing, and passage means defined in said securing screw and said axle spindle bolt extending downwardly from said head portion to the space enclosed by said gasket, said passage means being alignable with said grease fitting for lubricating said ball joint at the interior of said housing.

4. A ball joint construction, particularly for the connection of wheel guide members to the wheels of motor vehicles, comprising a ball joint member having a substantially spherical exterior surface, a bore defined therethrough with an interior shoulder defined in the bore, an axle spindle bolt inserted into the bore from the end opposite the shoulder, said spindle bolt having a threaded bore defined in an end face thereof, a securing screw extending into the bore of said ball joint member and having a head portion engaged on the interior shoulder and having a threaded end portion threaded into the bore of said axle spindle bolt, a housing having means therein defining an interior substantially spherical surface in sliding engagement with said ball member and being pivotal on said ball member, said housing having an access opening alignable with the bore of said ball joint member for access to said securing screw, a flexible gasket extending between said housing and said axle spindle bolt and defining a lubricating space surrounding said axle spindle bolt and a portion of said ball joint member, and a lubricating passage extending downwardly from the access opening through said bolt and out through said axle spindle for directing lubrication from the head of said securing screw to the interior of said flexible gasket.

References Cited by the Examiner

UNITED STATES PATENTS

| 1,787,459 | 1/1931 | Tawresey | 308—72 X |
| 2,198,744 | 4/1940 | Schwemlein. | |
| 2,550,369 | 4/1951 | Moreillon | 287—21 |
| 2,845,290 | 7/1958 | Latzen. | |
| 3,052,477 | 9/1962 | Parker. | |

FOREIGN PATENTS

| 806,438 | 9/1936 | France. |
| 1,089,717 | 10/1954 | France. |
| 1,307,534 | 9/1962 | France. |
| 739,059 | 9/1943 | Germany. |
| 231,715 | 4/1925 | Great Britain. |

CARL W. TOMLIN, *Primary Examiner.*

A. V. KUNDRAT, *Assistant Examiner.*